United States Patent
McGinnis et al.

(10) Patent No.: US 12,473,226 B2
(45) Date of Patent: *Nov. 18, 2025

(54) HIGH PERFORMANCE FIBERGLASS COMPOSITION

(71) Applicant: Owens Corning Intellectual Capital, LLC, Toledo, OH (US)

(72) Inventors: Peter Bernard McGinnis, Gahanna, OH (US); Michelle Korwin-Edson, Granville, OH (US)

(73) Assignee: OWENS CORNING INTELLECTUAL CAPITAL, LLC, Toledo, OH (US)

( * ) Notice: Subject to any disclaimer, the term of this patent is extended or adjusted under 35 U.S.C. 154(b) by 541 days.

This patent is subject to a terminal disclaimer.

(21) Appl. No.: 17/534,333

(22) Filed: Nov. 23, 2021

(65) Prior Publication Data

US 2022/0081350 A1 Mar. 17, 2022

Related U.S. Application Data

(63) Continuation of application No. 16/225,011, filed on Dec. 19, 2018, now Pat. No. 11,214,512.

(60) Provisional application No. 62/607,498, filed on Dec. 19, 2017.

(51) Int. Cl.
| | |
|---|---|
| C03C 13/00 | (2006.01) |
| C03C 3/087 | (2006.01) |
| C08J 5/04 | (2006.01) |
| C03B 37/02 | (2006.01) |

(52) U.S. Cl.
CPC .............. *C03C 13/00* (2013.01); *C03C 3/087* (2013.01); *C08J 5/043* (2013.01); *C03B 37/02* (2013.01); *C03C 2213/00* (2013.01)

(58) Field of Classification Search
CPC ................ C03C 3/087; C03C 13/00
See application file for complete search history.

(56) References Cited

U.S. PATENT DOCUMENTS

| | | | |
|---|---|---|---|
| 7,687,420 B2 | 3/2010 | Murata | |
| 7,786,035 B2 | 8/2010 | Kishimoto et al. | |
| 7,838,451 B2 | 11/2010 | Nishizawa et al. | |
| 7,960,301 B2 | 6/2011 | Niida et al. | |
| 7,989,375 B2 | 8/2011 | Tanaka | |
| 8,129,299 B2 | 3/2012 | Kishimoto et al. | |
| 8,168,295 B2 | 5/2012 | Murata | |
| 8,168,313 B2 | 5/2012 | Endo et al. | |
| 8,334,228 B2 | 12/2012 | Zhang et al. | |
| 8,399,370 B2 | 3/2013 | Niida et al. | |
| 8,476,175 B2 | 7/2013 | Lecomte | |
| 8,647,995 B2 | 2/2014 | Aitken et al. | |
| 8,679,631 B2 | 3/2014 | Murata | |
| 8,703,633 B2 | 4/2014 | Tang | |
| 8,841,222 B2 | 9/2014 | Nonaka et al. | |
| 8,871,662 B2 | 10/2014 | Lecomte et al. | |
| 9,034,469 B2 | 5/2015 | Murata | |
| 9,051,207 B2 | 6/2015 | Han et al. | |
| 9,054,250 B2 | 6/2015 | Murata | |
| 9,102,564 B2 | 8/2015 | Druart et al. | |
| 9,242,892 B2 | 1/2016 | Nonaka et al. | |
| 9,278,883 B2 | 3/2016 | Li et al. | |
| 9,299,869 B2 | 3/2016 | Murata | |
| 9,416,235 B2 | 8/2016 | Nonaka et al. | |
| 9,499,432 B2 | 11/2016 | Yves et al. | |
| 9,530,910 B2 | 12/2016 | Aitken et al. | |
| 9,546,107 B2 | 1/2017 | Mcginnis et al. | |
| 9,556,063 B2 | 1/2017 | Zhao et al. | |
| 9,593,038 B2 | 3/2017 | Li et al. | |
| 9,637,408 B2 | 5/2017 | Aitken et al. | |
| 9,650,282 B2 | 5/2017 | Yang | |
| 9,688,565 B2 | 6/2017 | Senshu et al. | |
| 9,714,189 B2 | 7/2017 | Li | |
| 9,758,423 B2 | 9/2017 | Cao et al. | |
| 9,783,454 B2 | 10/2017 | Hausrath et al. | |
| 9,878,941 B2 | 1/2018 | Hofmann et al. | |
| 9,878,942 B2 | 1/2018 | Nonaka et al. | |
| 9,902,645 B2 | 2/2018 | Ono et al. | |

(Continued)

FOREIGN PATENT DOCUMENTS

| | | |
|---|---|---|
| CN | 101062835 A | 10/2007 |
| CN | 101580344 A | 11/2009 |

(Continued)

OTHER PUBLICATIONS

Office Action from CN Application No. 201811557814.X dated Mar. 1, 2022.
Office Action from CN Application No. 202211237607.2 dated Nov. 20, 2023.
Office Action from EG Application No. 847/2020.
Office Action from KR Application No. 10-2020-7020251 dated Aug. 16, 2023.
Office Action from SA Application No. 520412234 dated Oct. 29, 2022.
Office Action from JP Application No. 2020-533063 dated Nov. 30, 2022.

(Continued)

*Primary Examiner* — Elizabeth A. Bolden
(74) *Attorney, Agent, or Firm* — Bryan D. Zerhusen, Esq.; Nicholas R. Herrel, Esq.; CANTOR COLBURN LLP

(57) ABSTRACT

A glass composition is provided that includes about 55.0 to 60.4% by weight $SiO_2$, about 19.0 to 25.0% by weight $Al_2O_3$, about 8.0 to 15.0% by weight MgO, about 7 to 12.0% by weight CaO, less than 0.5% by weight $Li_2O$, 0.0 to about 1.0% by weight $Na_2O$, and 0 to about 1.5% by weight $TiO_2$. The glass composition has a fiberizing temperature of no greater than about 2,500° F. Glass fibers formed from the inventive composition may be used in applications that require high stiffness, and low weight. Such applications include woven fabrics for use in forming wind blades and aerospace structures.

18 Claims, No Drawings

(56) References Cited

U.S. PATENT DOCUMENTS

| | | | |
|---|---|---|---|
| 9,932,263 B2 | 4/2018 | Berthereau et al. | |
| 9,932,264 B2 | 4/2018 | Iwata et al. | |
| 9,944,551 B2 | 4/2018 | Li | |
| 9,957,191 B2 | 5/2018 | Li et al. | |
| 10,023,491 B2 | 7/2018 | Zhao et al. | |
| 10,065,883 B2 | 9/2018 | Li et al. | |
| 10,155,686 B2 | 12/2018 | Cao et al. | |
| 10,167,227 B2 | 1/2019 | Meng et al. | |
| 10,189,742 B2 | 1/2019 | Zhang et al. | |
| 11,214,512 B2* | 1/2022 | McGinnis | C03C 13/00 |
| 2009/0208428 A1 | 8/2009 | Hill et al. | |
| 2009/0286440 A1 | 11/2009 | Lecomte et al. | |
| 2010/0184345 A1 | 7/2010 | Lalande et al. | |
| 2012/0163987 A1 | 6/2012 | Hausrath et al. | |
| 2013/0209773 A1 | 8/2013 | Endo et al. | |
| 2013/0210602 A1 | 8/2013 | Nonaka et al. | |
| 2014/0357143 A1 | 12/2014 | Nonaka et al. | |
| 2015/0126354 A1 | 5/2015 | Endo et al. | |
| 2015/0133284 A1 | 5/2015 | Yves et al. | |
| 2015/0360996 A1 | 12/2015 | Preiss-Daimler | |
| 2016/0137546 A1 | 5/2016 | Lambricht et al. | |
| 2016/0137550 A1 | 5/2016 | Murata et al. | |
| 2016/0152511 A1 | 6/2016 | Lambricht et al. | |
| 2016/0168012 A1 | 6/2016 | Lambricht et al. | |
| 2016/0176753 A1 | 6/2016 | Lecomte et al. | |
| 2016/0176754 A1 | 6/2016 | Lecomte et al. | |
| 2016/0194241 A1 | 7/2016 | Lambricht et al. | |
| 2016/0362327 A1 | 12/2016 | Cao et al. | |
| 2017/0066683 A1 | 3/2017 | Lecomte et al. | |
| 2017/0226003 A1 | 8/2017 | Nonaka et al. | |
| 2017/0283307 A1 | 10/2017 | Yuan et al. | |
| 2017/0283310 A1 | 10/2017 | Mcginnis et al. | |
| 2018/0086660 A1 | 3/2018 | Saito | |
| 2018/0086661 A1 | 3/2018 | Zhang et al. | |
| 2018/0118608 A1 | 5/2018 | Zhang et al. | |
| 2018/0118611 A1 | 5/2018 | Cao et al. | |
| 2018/0179103 A1 | 6/2018 | Zhang et al. | |
| 2018/0179104 A1 | 6/2018 | Zhang et al. | |
| 2018/0186688 A1 | 7/2018 | Zhang et al. | |
| 2018/0208497 A1 | 7/2018 | Zhang et al. | |
| 2018/0230039 A1 | 8/2018 | Cao et al. | |
| 2019/0010077 A1 | 1/2019 | Zhang et al. | |
| 2023/0051530 A1* | 2/2023 | McGinnis | C08J 5/043 |

FOREIGN PATENT DOCUMENTS

| | | | |
|---|---|---|---|
| CN | 102276153 A | 12/2011 | |
| CN | 102336521 A | 2/2012 | |
| CN | 102491644 A | 6/2012 | |
| CN | 102786223 A | 11/2012 | |
| CN | 102849958 A | 1/2013 | |
| CN | 103339076 A | 10/2013 | |
| CN | 103449728 A | 12/2013 | |
| CN | 104108955 A | 10/2014 | |
| CN | 104291685 A | 1/2015 | |
| CN | 104445966 A | 3/2015 | |
| CN | 104478223 A | 4/2015 | |
| CN | 104591541 A | 5/2015 | |
| CN | 104591542 A | 5/2015 | |
| CN | 104803606 A | 7/2015 | |
| CN | 105084768 A | 11/2015 | |
| CN | 105110650 A | 12/2015 | |
| CN | 105152539 A | 12/2015 | |
| CN | 105174731 A | 12/2015 | |
| CN | 105189385 A | 12/2015 | |
| CN | 105452182 A | 3/2016 | |
| CN | 105461231 A | 4/2016 | |
| CN | 105601115 A | 5/2016 | |
| CN | 105645774 A | 6/2016 | |
| CN | 105837048 A | 8/2016 | |
| CN | 106007369 A | 10/2016 | |
| CN | 106986548 A | 7/2017 | |
| CN | 107056075 A | 8/2017 | |
| CN | 107056076 A | 8/2017 | |
| CN | 107082569 A | 8/2017 | |
| CN | 107216042 A | 9/2017 | |
| CN | 108373268 A | 8/2018 | |
| CN | 108395109 A | 8/2018 | |
| CN | 108503227 A | 9/2018 | |
| CN | 108609859 A | 10/2018 | |
| EP | 2354106 A1 | 8/2011 | |
| EP | 2581350 A1 | 4/2013 | |
| EP | 2655276 A1 | 10/2013 | |
| EP | 2789442 A1 * | 10/2014 | B29B 11/02 |
| EP | 2789592 A1 | 10/2014 | |
| EP | 3026029 A1 | 6/2016 | |
| EP | 3147267 A1 | 3/2017 | |
| EP | 3197842 A1 | 8/2017 | |
| EP | 3415474 A2 | 12/2018 | |
| JP | 2003321247 A | 11/2003 | |
| JP | 2006241450 A | 9/2006 | |
| JP | 5988013 B1 * | 9/2016 | C03C 13/00 |
| WO | 2012087313 A1 | 6/2012 | |
| WO | 2013156477 A1 | 10/2013 | |
| WO | 2014062715 A1 | 4/2014 | |
| WO | 2014208522 A1 | 12/2014 | |
| WO | 2015030013 A1 | 3/2015 | |
| WO | 2016086500 A1 | 6/2016 | |
| WO | 2016086501 A1 | 6/2016 | |
| WO | 2016159345 A1 | 10/2016 | |
| WO | 2016179134 A1 | 11/2016 | |
| WO | 2017002835 A1 | 1/2017 | |
| WO | 2017171102 A1 | 10/2017 | |
| WO | 2018123328 A1 | 7/2018 | |
| WO | 2018233342 A1 | 12/2018 | |

OTHER PUBLICATIONS

Office Action from U.S. Appl. No. 16/225,011 dated Nov. 13, 2020.
Office Action from U.S. Appl. No. 16/225,011 dated Mar. 22, 2021.
Notice of Allowance from U.S. Appl. No. 16/225,011 dated Sep. 1, 2021.
International Search Report and Written Opinion from PCT/US2018/066365 dated Mar. 20, 2019.
Extended European Search Report from EP Application No. 18214162.2 dated Apr. 15, 2019.
Communication from EP Application No. 18214162.2 dated Jun. 19, 2020.
Office Action from BR Application No. BR1120200125261 dated Apr. 29, 2022.
Office Action from UAE Application No. P6000894/2020 dated Dec. 13, 2023.
Office Action from MY Application No. PI2020003147 dated Dec. 21, 2023.
Office Action from CN Application No. 202211237607.2 dated May 11, 2023.
Office Action from JP Application No. 2020-533063 dated May 18, 2023.
Office Action from EG Application No. 847/2020 dated Aug. 2, 2022.
Office Action from EG Application No. 847/2020 dated Apr. 13, 2023.
Office Action from U.S. Appl. No. 17/963,583 dated May 3, 2024.
Office Action from BR Application No. BR1120200125261 dated Sep. 19, 2024.
Office Action from KR Application No. 10-2024-7016646 dated Jun. 17, 2024.
Office Action from U.S. Appl. No. 17/963,583 dated Dec. 10, 2024.
Office Action from CA Application No. 3,085,496 dated Feb. 4, 2025.
Notice of Allowance from U.S. Appl. No. 17/963,583 dated Mar. 5, 2025.
Office Action from KR Application No. 10-2024-7016646 dated Feb. 24, 2025.

* cited by examiner

HIGH PERFORMANCE FIBERGLASS COMPOSITION

CROSS-REFERENCE TO RELATED APPLICATIONS

This application is a continuation of U.S. patent application Ser. No. 16/225,011, filed on Dec. 19, 2018, which claims priority to and any benefit of U.S. Provisional Patent Application No. 62/607,498, filed Dec. 19, 2017, the contents of which are incorporated herein by reference in their entirety.

BACKGROUND OF THE INVENTION

Glass fibers are manufactured from various raw materials combined in specific proportions to yield a desired composition, commonly termed a "glass batch." This glass batch may be melted in a melting apparatus and the molten glass is drawn into filaments through a bushing or orifice plate (the resultant filaments are also referred to as continuous glass fibers). A sizing composition containing lubricants, coupling agents and film-forming binder resins may then be applied to the filaments. After the sizing is applied, the fibers may be gathered into one or more strands and wound into a package or, alternatively, the fibers may be chopped while wet and collected. The collected chopped strands may then be dried and cured to form dry chopped fibers or they can be packaged in their wet condition as wet chopped fibers.

The composition of the glass batch, along with the fiberglass manufactured therefrom, is often expressed in terms of the oxides contained therein, which commonly include $SiO_2$, $Al_2O_3$, CaO, MgO, $B_2O_3$, $Na_2O$, $K_2O$, $Fe_2O_3$, $TiO_2$, $Li_2O$, and the like. Numerous types of glasses may be produced from varying the amounts of these oxides, or eliminating some of the oxides in the glass batch. Examples of such glasses that may be produced include R-glass, E-glass, S-glass, A-glass, C-glass, and ECR-glass. The glass composition controls the forming and product properties of the glass. Other characteristics of glass compositions include the raw material cost and environmental impact.

For instance, E-glass is an aluminoborosilicate glass, generally alkali-free, and commonly used in electrical applications. One advantage of E-Glass is that its liquidus temperature allows operating temperatures for producing glass fibers to be approximately 1900° F. to 2400° F. (1038° C. to 1316° C.). The ASTM classification for E-glass fiber yarns used in printed circuit boards and aerospace applications defines the composition to be 52 to 56 weight % $SiO_2$, 16 to 25 weight % CaO, 12 to 16 weight % $Al_2O_3$, 5 to 10 weight % $B_2O_3$, 0 to 5 weight % MgO, 0 to 2 weight % $Na_2O$ and $K_2O$, 0 to 0.8 weight % $TiO_2$, 0.05 to 0.4 weight % $Fe_2O_3$ and 0 to 1.0 weight % Fluorine.

Boron-free fibers are sold under the trademark ADVANTEX® (Owens Corning, Toledo, Ohio, USA). Boron-Free fibers, such as are disclosed in U.S. Pat. No. 5,789,329, incorporated herein by reference in its entirety, offer a significant improvement in operating temperatures over boron-containing E-glass. Boron-Free glass fibers fall under the ASTM definition for E-glass fibers for use in general-use applications.

R-Glass is a family of glasses that are composed primarily of the oxides of silicon, aluminum, magnesium, and calcium with a chemical composition that produces glass fibers with a higher mechanical strength than E-Glass fibers. R-Glass has a composition that contains about 58 to about 60% by weight $SiO_2$, about 23.5 to about 25.5% by weight $Al_2O_3$, about 14 to about 17% by weight CaO plus MgO, and less than about 2% by weight of miscellaneous components. R-Glass contains more alumina and silica than E-Glass and requires higher melting and processing temperatures during fiber forming. Typically, the melting and processing temperatures for R-Glass are higher than those for E-Glass. This increase in processing temperature requires the use of a high-cost platinum-lined melter. In addition, the close proximity of the liquidus temperature to the forming temperature in R-Glass requires that the glass be fiberized at a viscosity lower than E-Glass, which is customarily fiberized at or near about 1000 poise. Fiberizing R-Glass at the customary 1000 poise viscosity would likely result in glass devitrification, which causes process interruptions and reduced productivity.

High performance glass fibers possess higher strength and stiffness, compared to traditional E-glass fibers. In particular, for some products, stiffness is crucial for modeling and performance. For example, composites, such as wind blades, prepared from glass fibers with good stiffness properties would allow for longer wind blades on electrical generating wind stations while keeping flexure of the blade within acceptable limits.

Additionally, high-performance glass compositions are desired that possess favorable mechanical and physical properties (e.g., specific modulus and tensile strength), while maintain desirable forming properties (e.g., liquidus temperature and fiberizing temperature).

In particular, there is a need in the art for high-performance glass compositions with acceptable forming properties such as having a sufficiently low fiberizing temperature, which glass compositions retain favorable mechanical and physical properties.

SUMMARY OF THE INVENTION

Various exemplary embodiments of the present inventive concepts are directed to a glass composition comprising $SiO_2$ in an amount from 55.0 to 60.4% by weight; $Al_2O_3$ in an amount from 19.0 to 25.0% by weight; CaO in an amount from 7 to 12.0% by weight; MgO in an amount from 8.0 to 15.0% by weight; $Na_2O$ in an amount from 0 to 1.0% by weight; $Li_2O$ in an amount less than 0.5% by weight; and $TiO_2$ in an amount from 0.0 to 1.5% by weight, expressed as percentages by weight based on the weight of the entire composition. The weight percent ratio of $Al_2O_3$/MgO is less than 2.0 and glass composition has a fiberizing temperature no greater than 2,500° F.

In any of the various embodiments, the combined amounts of $SiO_2$, $Al_2O_3$, MgO, and CaO may be at least 98% by weight and less than 99.5% by weight.

In any of the various embodiments, the combined amounts of MgO and CaO may be greater than 20% by weight.

In any of the various embodiments, the combined amounts of MgO and CaO may be less than 22% by weight.

In any of the various embodiments, the glass composition may be essentially free of at least one of $B_2O_3$ and $Li_2O$.

In any of the various embodiments, the combined amounts of $Fe_2O_3$, $TiO_2$, $K_2O$, and $Na_2O$ may be below 1.5% by weight.

Further exemplary aspects of the present inventive concepts are directed to a glass composition comprising $SiO_2$ in an amount from 55.0 to 65.0% by weight; $Al_2O_3$ in an amount from 19.0 to 25.0% by weight; CaO in an amount from 7 to 12.0% by weight; MgO in an amount from 8.0 to 15.0% by weight; $Na_2O$ in an amount from 0 to 1.0% by weight; $Li_2O$ in an amount less than 0.5% by weight; and $TiO_2$ in an amount from 0.0 to 1.5% by weight. In various exemplary embodiments, the total weight percentage of CaO and MgO is greater than 20% by weight and the weight percent ratio of $Al_2O_3/MgO$ is less than 2.0. The glass composition has a fiberizing temperature no greater than 2,500° F.

In any of the various embodiments, the composition comprises 19.5 to 21% by weight $Al_2O_3$.

In any of the various embodiments, the weight percent ratio of $Al_2O_3/MgO$ is no greater than 1.8.

In any of the various embodiments, the glass composition may be essentially free of at least one of $B_2O_3$ and $Li_2O$.

Yet further exemplary aspects of the present inventive concepts are directed to a glass fiber formed from a glass composition comprising $SiO_2$ in an amount from 55.0 to 60.4% by weight; $Al_2O_3$ in an amount from 19.0 to 25.0% by weight; CaO in an amount from 7 to 12.0% by weight; MgO in an amount from 8.0 to 15.0% by weight; $Na_2O$ in an amount from 0 to 1.0% by weight; $Li_2O$ in an amount less than 0.5% by weight; and $TiO_2$ in an amount from 0.0 to 1.5% by weight, expressed as percentages by weight based on the weight of the entire composition, wherein the weight percent ratio of $Al_2O_3/MgO$ is less than 2.0, and wherein said glass fiber has a tensile strength of at least 4,800 MPa.

In any of the various embodiments, the weight percent ratio of $Al_2O_3/MgO$ is no greater than 1.8.

In any of the various embodiments, the glass fiber has a specific modulus of at least 32.0 MJ/kg.

Yet further exemplary aspects of the inventive concepts are directed to a method of forming a continuous glass fiber that includes providing a molten composition according to any of the exemplary embodiments disclosed herein and drawing the molten composition through an orifice to form a continuous glass fiber.

Further exemplary aspects of the inventive concepts are directed to a reinforced composite product comprising a polymer matrix and a plurality of glass fibers formed from a glass composition comprising: $SiO_2$ in an amount from 55.0 to 60.4% by weight; $Al_2O_3$ in an amount from 19.0 to 25.0% by weight; CaO in an amount from 7 to 12.0% by weight; MgO in an amount from 8.0 to 15.0% by weight; $Na_2O$ in an amount from 0 to 1.0% by weight; $Li_2O$ in an amount less than 0.5% by weight; and $TiO_2$ in an amount from 0.0 to 1.5% by weight, expressed as percentages by weight based on the weight of the entire composition, wherein the weight percent ratio of $Al_2O_3/MgO$ is less than 2.0, and wherein said glass fibers have tensile strengths of at least 4,800 MPa.

The foregoing and other objects, features, and advantages of the invention will appear more fully hereinafter from a consideration of the detailed description that follows.

DETAILED DESCRIPTION

Unless otherwise defined, all technical and scientific terms used herein have the same meaning as commonly understood by one of ordinary skill in the art to which these exemplary embodiments belong. The terminology used in the description herein is for describing exemplary embodiments only and is not intended to be limiting of the exemplary embodiments. Accordingly, the general inventive concepts are not intended to be limited to the specific embodiments illustrated herein. Although other methods and materials similar or equivalent to those described herein can be used in the practice or testing of the present invention, the preferred methods and materials are described herein.

As used in the specification and the appended claims, the singular forms "a," "an," and "the" are intended to include the plural forms as well, unless the context clearly indicates otherwise.

Unless otherwise indicated, all numbers expressing quantities of ingredients, chemical and molecular properties, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least each numerical parameter should be construed in light of the number of significant digits and ordinary rounding approaches.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein. Moreover, any numerical value reported in the Examples may be used to define either an upper or lower end-point of a broader compositional range disclosed herein.

The present disclosure relates to a high-performance glass composition with improved tensile strength and modulus, while being essentially lithium free. By "essentially lithium free," it is meant that lithium is not intentionally added and the glass composition includes no greater than 5.0% by weight of lithium, including no greater than 4.0% by weight, 3.0% by weight, 2.0% by weight, 1.0% by weight, 0.5% by weight, and 0.1% by weight. In some exemplary embodiments, the glass composition includes between 0 and 1.0% by weight lithium, including between 0 and 0.5% by weight, and between 0 and 0.05% by weight. In some exemplary embodiments, the glass composition is entirely free of lithium.

The glass compositions disclosed herein are suitable for melting in traditional commercially available refractory-lined glass furnaces, which are widely used in the manufacture of glass reinforcement fibers.

The glass composition may be in molten form, obtainable by melting the components of the glass composition in a melter. The glass composition exhibits a low fiberizing temperature, which is defined as the temperature that corresponds to a melt viscosity of about 1000 Poise, as determined by ASTM C965-96(2007). Lowering the fiberizing temperature may reduce the production cost of the glass fibers because it allows for a longer bushing life and reduced energy usage necessary for melting the components of a glass composition. Therefore, the energy expelled is generally less than the energy necessary to melt many commercially available glass formulations. Such lower energy requirements may also lower the overall manufacturing costs associated with the glass composition.

For example, at a lower fiberizing temperature, a bushing may operate at a cooler temperature and therefore does not "sag" as quickly as is typically seen. "Sag" is a phenomenon that occurs when a bushing that is held at an elevated temperature for extended periods of time loses its determined stability. Thus, by lowering the fiberizing temperature, the sag rate of the bushing may be reduced and the bushing life can be maximized.

In some exemplary embodiments, the glass composition has a fiberizing temperature of less than 2,500° F., including fiberizing temperatures of no greater than 2,475° F., no greater than 2470° F., no greater than 2420° F., no greater than 2410° F., no greater than 2405° F., no greater than 2400° F., and no greater than 2390° F., and no greater than 2385° F.

Another fiberizing property of a glass composition is the liquidus temperature. The liquidus temperature is defined as the highest temperature at which equilibrium exists between liquid glass and its primary crystalline phase. The liquidus temperature, in some instances, may be measured by exposing the glass composition to a temperature gradient in a platinum-alloy boat for 16 hours (ASTM C829-81(2005)). At all temperatures above the liquidus temperature, the glass is completely molten, i.e., it is free from crystals. At temperatures below the liquidus temperature, crystals may form.

In some exemplary embodiments, the glass composition has a liquidus temperature below 2,500° F., including liquidus temperature of no greater than 2,400° F., no greater than 2,375° F., no greater than 2,350° F., no greater than 2,325° F., no greater than 2,305° F., no greater than 2,300° F., no greater than 2,290° F., no greater than 2,250° F., no greater than 2,225° F., and no greater than 2,215° F.

A third fiberizing property is "ΔT", which is defined as the difference between the fiberizing temperature and the liquidus temperature. If the ΔT is too small, the molten glass may crystallize within the fiberizing apparatus and cause a break in the manufacturing process. Desirably, the ΔT is as large as possible for a given forming viscosity because it offers a greater degree of flexibility during fiberizing and helps to avoid devitrification both in the glass distribution system and in the fiberizing apparatus. A large ΔT additionally reduces the production cost of the glass fibers by allowing for a greater bushing life and a less sensitive forming process.

In some exemplary embodiments, the glass composition has a ΔT of at least 80 F, including at least 100° F., at least 110° F., at least 120° F., at least 135° F., at least 150° F., and at least 170° F. In various exemplary embodiments, the glass composition has a ΔT between 100° F. and 250° F., including between 120° F. and 200° F., and between 150° F. and 190° F.

An additional glass fiberizing property is the annealing temperature, which is the temperature at which the glass viscosity drops to $10^{13}$ Poise. Glass annealing is a controlled process of slowly cooling the glass to relieve internal stress caused during rapid cooling of glass fibers. At temperatures above the annealing temperature, the filaments begin to "sinter" and coalesce at various contact points. One of the benefits of the subject glass composition is a high annealing temperature (at least 750° C.), which allows the fibers to be used in high temperature applications, such as muffler filling. In contrast, E-glass fibers have an annealing temperature between 680 and 690° C., and boron-free E-glass fibers generally have annealing temperatures no greater than about 720° C.

The glass composition may include about 55.0 to about 65.0% by weight $SiO_2$, about 17.0 to about 27.0% by weight $Al_2O_3$, about 8.0 to about 15.0% by weight MgO, about 7.0 to about 12.0% by weight CaO, about 0.0 to about 1.0% by weight $Na_2O$, 0 to about 2.0% by weight $TiO_2$, 0 to about 2.0% by weight $Fe_2O_3$, and no more than 0.5% by weight $Li_2O$. Advantageously, the ratio of the weight percent of alumina oxide and magnesium oxide ($Al_2O_3$/MgO) is no greater than 2.0, such as no greater than 1.9, and no greater than 1.8. Additionally, the ratio of the weight percent of magnesium oxide to calcium oxide (MgO/CaO) is advantageously at least 1.2.

In some exemplary embodiments, the glass composition may comprise about 57.0 to about 62.0% by weight $SiO_2$, about 19.0 to about 25.0% by weight $Al_2O_3$, about 10.5 to about 14.0% by weight MgO, about 7.5 to about 10.0% by weight CaO, about 0.0 to about 0.5% by weight $Na_2O$, 0.2 to about 1.5% by weight $TiO_2$, 0 to about 1.0% by weight $Fe_2O_3$, and no more than 0.1% by weight $Li_2O$. In some exemplary embodiments, the glass composition includes an $Al_2O_3$/MgO ratio less than 2 and an MgO/CaO ratio of at least 1.25.

In some exemplary embodiments, the glass composition may comprise about 57.5 to about 60.0% by weight $SiO_2$, about 19.5 to about 21.0% by weight $Al_2O_3$, about 11.0 to about 13.0% by weight MgO, about 8.0 to about 9.5% by weight CaO, about 0.02 to about 0.25% by weight $Na_2O$, 0.5 to about 1.2% by weight $TiO_2$, 0 to about 0.5% by weight $Fe_2O_3$, and no more than 0.05% by weight $Li_2O$. In some exemplary embodiments, the glass composition includes an $Al_2O_3$/MgO no greater than 1.8 and an MgO/CaO ratio of at least 1.25.

The glass composition includes at least 55% by weight, but no greater than 65% by weight $SiO_2$. Including greater than 65% by weight $SiO_2$ causes the viscosity of the glass composition to increase to an unfavorable level. Moreover, including less than 55% by weight $SiO_2$ increases the liquidus temperature and the crystallization tendency. In some exemplary embodiments, the glass composition includes at least 57% by weight $SiO_2$, including at least 57.5% by weight, at least 58% by weight, at least 58.5% by weight, and at least 59% by weight. In some exemplary embodiments, the glass composition includes no greater than 60.5% by weight $SiO_2$, including no greater than 60.3% by weight, no greater than 60.2% by weight, no greater than 60% by weight, no greater than 59.8% by weight, and no greater than 59.5% by weight.

To achieve both the desired mechanical and fiberizing properties, one important aspect of the glass composition is having a $Al_2O_3$ concentration of at least 19.0% by weight and no greater than 27% by weight. Including greater than 27% by weight $Al_2O_3$ causes the glass liquidus to increase to a level above the fiberizing temperature, which results in a negative ΔT. Including less than 19% by weight $Al_2O_3$ forms a glass fiber with an unfavorably low modulus. In some exemplary embodiments, the glass composition includes at least 19.5% by weight $Al_2O_3$, including at least 19.7% by weight, at least 20% by weight, at least 20.25% by weight, and at least 20.5% by weight.

The glass composition advantageously includes at least 8.0% by weight and no greater than 15% by weight MgO. Including greater than 15% by weight MgO will cause the liquidus temperature to increase, which also increases the glass's crystallization tendency. Including less than 8.0% by weight forms a glass fiber with an unfavorably low modulus is substituted by CaO and an unfavorable increase in viscosity if substituted with $SiO_2$. In some exemplary embodiments, the glass composition includes at least 9.5% by weight MgO, including at least 10% by weight, at least 10.5% by weight, at least 11% by weight, at least 11.10% by weight, at least 11.25% by weight, at least 12.5% by weight, and at least 13% by weight MgO.

Another important aspect of the subject glass composition that makes it possible to achieve the desired mechanical and fiberizing properties, is having an $Al_2O_3$/MgO ratio of no greater than 2.0. It has been discovered that glass fibers having compositions with otherwise similar compositional ranges, but with $Al_2O_3/MgO$ ratios greater than 2.0, are unable to achieve tensile strengths of at least 4,800 MPa. In certain exemplary aspects, the combination of an $Al_2O_3$ concentration of at least 19% by weight and an $Al_2O_3/MgO$ ratio of no greater than 2, such as no greater than 1.9, and no greater than 1.85, makes it possible to obtain glass fibers with desirable fiberizing properties and tensile strengths of at least 4,800 MPa.

The glass composition advantageously includes at least 7.0% by weight and no greater than 12% by weight CaO. Including greater than 12% by weight CaO forms a glass with a low elastic modulus. Including less than 7% by weight will either unfavorably increase the liquidus temperature or viscosity depending on what the CaO is substituted with. In some exemplary embodiments, the glass composition includes at least 8.0% by weight CaO, including at least 8.3% by weight, at least 8.5% by weight, at least 8.7% by weight, and at least 9.0% by weight.

In some exemplary embodiments, the combined amounts of $SiO_2$, $Al_2O_3$, MgO, and CaO is at least 98% by weight, or at least 99% by weight, and no greater than 99.5% by weight. In some exemplary embodiments, the combined amounts of $SiO_2$, $Al_2O_3$, MgO, and CaO is between 98.3% by weight and 99.5% by weight, including between 98.5% by weight and 99.4% by weight and 98.7% by weight and 99.3% by weight.

In some exemplary embodiments, the total concentration of MgO and CaO is at least 10% by weight and no greater than 22% by weight, including between 13% by weight and 21.8% by weight and between 14% by weight and 21.5% by weight. In some exemplary embodiments, the total concentration of MgO and CaO is at least 20% by weight.

The glass composition may include up to about 2.0% by weight $TiO_2$. In some exemplary embodiments, the glass composition includes about 0.01% by weight to about 1.0% by weight $TiO_2$, including about 0.1% by weight to about 0.8% by weight and about 0.2 to about 0.7% by weight.

The glass composition may include up to about 2.0% by weight $Fe_2O_3$. In some exemplary embodiments, the glass composition includes about 0.01% by weight to about 1.0% by weight $Fe_2O_3$, including about 0.05% by weight to about 0.6% by weight and about 0.1 to about 0.5% by weight.

In some exemplary embodiments, the glass composition includes less than 2.0 by weight of the alkali metal oxides $Na_2O$ and $K_2O$, including between 0 and 1.5% by weight. The glass composition may advantageously include both $Na_2O$ and $K_2O$ in an amount greater than 0.01% by weight of each oxide. In some exemplary embodiments, the glass composition includes about 0 to about 1% by weight $Na_2O$, including about 0.01 to about 0.5% by weight, about 0.03 to about 0.3% by weight, and 0.04 to about 0.1% by weight. In some exemplary embodiments, the glass composition includes about 0 to about 1% by weight $K_2O$, including about 0.01 to about 0.5% by weight, about 0.03 to about 0.3% by weight, and 0.04 to about 0.1% by weight.

As used herein, the terms "weight percent," "% by weight," ".%," and "percent by weight" may be used interchangeably and are meant to denote the weight percent (or percent by weight) based on the total composition.

The inventive glass compositions may be free or substantially free of $B_2O_3$, $Li_2O$, and fluorine, although either, or any, may be added in small amounts to adjust the fiberizing and finished glass properties and will not adversely impact the properties if maintained below several percent. As used herein, substantially free of $B_2O_3$, $Li_2O$, and fluorine means that the sum of the amounts of $B_2O_3$, $Li_2O$, and fluorine present is less than 1.0% by weight of the composition. The sum of the amounts of $B_2O_3$, $Li_2O$, and fluorine present may be less than about 0.5% by weight of the composition, including less than about 0.2% by weight, less than about 0.1% by weight, and less than about 0.05% by weight.

The glass compositions may further include impurities and/or trace materials without adversely affecting the glasses or the fibers. These impurities may enter the glass as raw material impurities or may be products formed by the chemical reaction of the molten glass with furnace components. Non-limiting examples of trace materials include zinc, strontium, barium, and combinations thereof. The trace materials may be present in their oxide forms and may further include fluorine and/or chlorine. In some exemplary embodiments, the inventive glass compositions contain less than 1.0% by weight, including less than 0.5% by weight, less than 0.2% by weight, and less than 0.1% by weight of each of BaO, SrO, ZnO, $ZrO_2$, $P_2O_5$, and $SO_3$. Particularly, the glass composition may include less than about 5.0% by weight of BaO, SrO, ZnO, $ZrO_2$, $P_2O_5$, and/or $SO_3$ combined, wherein each of BaO, SrO, ZnO, $ZrO_2$, $P_2O_5$, and $SO_3$ if present at all, is present in an amount of less than 1.0% by weight.

As indicated above, the inventive glass compositions unexpectedly demonstrate a low fiberizing temperature and large ΔT, while providing superior elastic (Young's) modulus and tensile strength.

The fiber tensile strength is also referred herein simply as "strength." In some exemplary embodiments, the tensile strength is measured on pristine fibers (i.e., unsized and untouched laboratory produced fibers) using an Instron tensile testing apparatus according to ASTM D2343-09. Exemplary glass fibers formed form the above described inventive glass composition may have a fiber tensile strength of at least 3,500 MPa, including at least 4,000 MPa, at least 4,500 MPa, at least 4,800 MPa, at least 4,900 MPa, at least 4,950 MPa, at least 5,000 MPa, at least 5,100 MPa, at least 5,150 MPa, and at least 5,200 MPa. In some exemplary embodiments, the glass fibers formed from the above described composition have a fiber tensile strength of from about 3500 to about 5500 MPa, including about 4000 MPa to about 5,300, about 4,600 to about 5,250 MPa. Advantageously, the combination of compositional parameters disclosed herein makes it possible to produce glass fibers having tensile strengths of at least 4,800 MPa, including at least 4,900 MPa, and at least 5,000, which has not yet been achieved by the prior art with a glass composition having desirable fiberizing properties.

The elastic modulus of a glass fiber may be determined by taking the average measurements on five single glass fibers measured in accordance with the sonic measurement procedure outlined in the report "Glass Fiber and Measuring Facilities at the U.S. Naval Ordnance Laboratory", Report Number NOLTR 65-87, Jun. 23, 1965.

The exemplary glass fibers formed from the inventive glass composition may have a Young's modulus of at least about 85 GPa, including at least about 88 GPa, at least about 88.5 GPa, at least about 89 GPa, and at least about 89.5 GPa. In some exemplary embodiments, the exemplary glass fibers formed from the inventive glass composition have a Young's modulus of between about 85 GPa and about 95 GPa, including between about 87 GPa and about 92 GPa, and between about 88 GPa and about 91 GPa.

The modulus may then be used to determine the specific modulus. It is desirable to have a specific modulus as high as possible to achieve a lightweight composite material that adds stiffness to the final article. Specific modulus is important in applications where stiffness of the product is an important parameter, such as in wind energy and aerospace applications. As used herein, the specific modulus is calculated by the following equation:

$$\text{Specific Modulus}(MJ/kg) = \text{Modulus}(GPa)/\text{Density}(kg/\text{cubic meter})$$

The exemplary glass fibers formed from the inventive glass composition may have a specific modulus from about 32.0 MJ/kg to about 37.0 MJ/kg, including about 33 MJ/kg to about 36 MJ/kg, and about 33.5 MJ/kg to about 35.5 MJ/kg.

The density may be measured by any method known and commonly accepted in the art, such as the Archimedes method (ASTM C693-93(2008)) on unannealed bulk glass. The glass fibers have a density of from about 2.0 to about 3.0 g/cc. In other exemplary embodiments, the glass fibers have a density of from about 2.3 to about 2.8 g/cc, including from about 2.4 to about 2.7 g/cc, and about 2.5 to about 2.65 g/cc.

In some exemplary embodiments, the glass fibers formed from the inventive glass composition have improved corrosion resistance.

According to some exemplary embodiments, a method is provided for preparing glass fibers from the glass composition described above. The glass fibers may be formed by any means known and traditionally used in the art. In some exemplary embodiments, the glass fibers are formed by obtaining raw ingredients and mixing the ingredients in the appropriate quantities to give the desired weight percentages of the final composition. The method may further include providing the inventive glass composition in molten form and drawing the molten composition through orifices in a bushing to form a glass fiber.

The components of the glass composition may be obtained from suitable ingredients or raw materials including, but not limited to, sand or pyrophyllite for $SiO_2$, limestone, burnt lime, wollastonite, or dolomite for CaO, kaolin, alumina or pyrophyllite for $Al_2O_3$, dolomite, dolomitic quicklime, brucite, enstatite, talc, burnt magnesite, or magnesite for MgO, and sodium carbonate, sodium feldspar or sodium sulfate for the $Na_2O$. In some exemplary embodiments, glass cullet may be used to supply one or more of the needed oxides.

The mixed batch may then be melted in a furnace or melter and the resulting molten glass is passed along a forehearth and drawn through the orifices of a bushing located at the bottom of the forehearth to form individual glass filaments. In some exemplary embodiments, the furnace or melter is a traditional refractory melter. By utilizing a refractory tank formed of refractory blocks, manufacturing costs associated with the production of glass fibers produced by the inventive composition may be reduced. In some exemplary embodiments, the bushing is a platinum alloy-based bushing. Strands of glass fibers may then be formed by gathering the individual filaments together. The fiber strands may be wound and further processed in a conventional manner suitable for the intended application.

The operating temperatures of the glass in the melter, forehearth, and bushing may be selected to appropriately adjust the viscosity of the glass, and may be maintained using suitable methods, such as control devices. The temperature at the front end of the melter may be automatically controlled to reduce or eliminate devitrification. The molten glass may then be pulled (drawn) through holes or orifices in the bottom or tip plate of the bushing to form glass fibers. In accordance with some exemplary embodiments, the streams of molten glass flowing through the bushing orifices are attenuated to filaments by winding a strand formed of a plurality of individual filaments on a forming tube mounted on a rotatable collet of a winding machine or chopped at an adaptive speed. The glass fibers of the invention are obtainable by any of the methods described herein, or any known method for forming glass fibers.

The fibers may be further processed in a conventional manner suitable for the intended application. For instance, in some exemplary embodiments, the glass fibers are sized with a sizing composition known to those of skill in the art. The sizing composition is in no way restricted, and may be any sizing composition suitable for application to glass fibers. The sized fibers may be used for reinforcing substrates such as a variety of plastics where the product's end use requires high strength and stiffness and low weight. Such applications include, but are not limited to, woven fabrics for use in forming wind blades; infrastructure, such as reinforcing concrete, bridges, etc.; and aerospace structures.

In this regard, some exemplary embodiments of the present invention include a composite material incorporating the inventive glass fibers, as described above, in combination with a hardenable matrix material. This may also be referred to herein as a reinforced composite product. The matrix material may be any suitable thermoplastic or thermoset resin known to those of skill in the art, such as, but not limited to, thermoplastics such as polyesters, polypropylene, polyamide, polyethylene terephthalate, and polybutylene, and thermoset resins such as epoxy resins, unsaturated polyesters, phenolics, vinylesters, and elastomers. These resins may be used alone or in combination. The reinforced composite product may be used for wind blade, rebar, pipe, filament winding, muffler filling, sound absorption, and the like.

In accordance with further exemplary embodiments, the invention provides a method of preparing a composite product as described above. The method may include combining at least one polymer matrix material with a plurality of glass fibers. Both the polymer matrix material and the glass fibers may be as described above.

EXAMPLES

Exemplary glass compositions according to the present invention were prepared by mixing batch components in proportioned amounts to achieve a final glass composition with the oxide weight percentages set forth in Tables 1-4, below.

The raw materials were melted in a platinum crucible in an electrically heated furnace at a temperature of 1,650° C. for 3 hours.

The fiberizing temperature was measured using a rotating cylinder method as described in ASTM C965-96(2007), entitled "Standard Practice for Measuring Viscosity of Glass Above the Softening Point," the contents of which are incorporated by reference herein. The liquidus temperature was measured by exposing glass to a temperature gradient in a platinum-alloy boat for 16 hours, as defined in ASTM C829-81(2005), entitled "Standard Practices for Measurement of Liquidus Temperature of Glass," the contents of which are incorporated by reference herein. Density was measured by the Archimedes method, as detailed in ASTM C693-93(2008), entitled "Standard Test Method for Density of Glass Buoyancy," the contents of which are incorporated by reference herein.

The specific modulus was calculated by dividing the measured modulus in units of GPa by the density in units of kg/m³.

The strength was measured on pristine fibers using an Instron tensile testing apparatus according to ASTM D2343-09 entitled, "Standard Test Method for Tensile Properties of Glass Fiber Strands, Yarns, and Rovings Used in Reinforced Plastics," the contents of which are incorporated by reference herein.

TABLE 1

| Component | Comp. Ex. 1 (% by wt.) | Comp. Ex. 2 (% by wt.) | Comp. Ex. 3 (% by wt.) | Comp. Ex. 4 (% by wt.) | Comp. Ex. 5 (% by wt.) |
|---|---|---|---|---|---|
| $SiO_2$ | 59.87 | 58.62 | 58.3 | 50.02 | 58.4 |
| $Al_2O_3$ | 21.53 | 21.2 | 21.08 | 21.01 | 21.2 |
| MgO | 9.08 | 10.14 | 10.14 | 10.05 | 10.15 |
| CaO | 7.8 | 8.74 | 8.74 | 8.69 | 8.75 |
| $Na_2O$ | 1.5 | 1.07 | 1.5 | 1.0 | 0.30 |
| $TiO_2$ | 0.03 | 0.03 | 0.03 | 0.83 | 0.85 |
| $Fe_2O_3$ | 0.16 | 0.18 | 0.18 | 0.32 | 0.33 |
| $SiO_2/Al_2O_3$ | 2.78 | 2.77 | 2.77 | 2.76 | 2.75 |
| MgO/CaO | 1.16 | 1.16 | 1.16 | 1.16 | 1.16 |
| $Al_2O_3$/MgO | 2.37 | 2.09 | 2.08 | 2.09 | 2.09 |
| Property | | | | | |
| Fiberizing Temperature (° F.) | 2502 | 2431 | 2426 | 2419 | 2418 |
| Liquidus Temperature (° F.) | 2300 | 2295 | 2309 | 2282 | 2276 |
| ΔT (° F.) | 202 | 137 | 117 | 137 | 142 |
| Density (g/cm³) | 2.57 | 2.6 | 2.59 | 2.6 | 2.6 |
| Strength (MPa) | 4780 | 4773 | 4685 | 4692 | 4750 |
| Specific Modulus (MJ/kg) | 34.2 | 34.2 | 34.2 | 34.2 | 34.3 |

The glass compositions above in Table 1 (Comp. Exs. 1-5) are replicated comparative examples from European application number 10860973.6. Although these comparative examples include $Al_2O_3$ concentrations above 19.0% by weight, the compositions include $Al_2O_3$/MgO ratios above 2, which results in tensile strengths far below the minimum tensile strength of 4,800 MPa achieved by the glass fibers formed from the inventive glass compositions disclosed herein.

TABLE 2

| Component | Example 1 (X11443) (% by wt.) | Example 2 (X11448) (% by wt.) | Example 3 (X11449) (% by wt.) | Example 4 (X11452) (% by wt.) | Example 5 (X11455) (% by wt.) |
|---|---|---|---|---|---|
| $SiO_2$ | 59.00 | 59.00 | 58.50 | 59.10 | 59.60 |
| $Al_2O_3$ | 20.00 | 21.00 | 21.00 | 19.00 | 20.50 |
| MgO | 11.10 | 11.10 | 11.60 | 13.00 | 12.00 |
| CaO | 9.00 | 8.00 | 8.00 | 8.00 | 7.00 |
| $Li_2O$ | 0.00 | 0.00 | 0.00 | 0.00 | 0.00 |
| $Fe_2O_3$ | 0.27 | 0.27 | 0.27 | 0.27 | 0.27 |
| $K_2O$ | 0.07 | 0.07 | 0.07 | 0.07 | 0.07 |
| $Na_2O$ | 0.06 | 0.06 | 0.06 | 0.06 | 0.06 |
| $TiO_2$ | 0.50 | 0.50 | 0.50 | 0.50 | 0.50 |
| $Al_2O_3$/MgO | 1.80 | 1.89 | 1.81 | 1.46 | 1.71 |
| MgO/CaO | 1.23 | 1.39 | 1.45 | 1.63 | 1.71 |
| Property | | | | | |
| Fiberizing Temperature (° F.) | 2402 | 2420 | 2407 | 2375 | 2423 |
| Liquidus Temperature (° F.) | 2220 | 2293 | 2269 | 2226 | 2303 |
| ΔT (° F.) | 182 | 128 | 139 | 149 | 120 |
| Density (g/cm³) | 2.601 | 2.600 | 2.606 | 2.616 | — |
| Elastic Modulus (GPa) | 89.22 | 89.71 | 90.09 | 90.42 | — |
| Specific Modulus (MJ/kg) | 34.30 | 34.50 | 34.57 | 34.56 | — |
| Strength (MPa) | 5122 | 5239 | 5059 | 5119 | — |

TABLE 3

| Component | Example 6 (X11456) (% by wt.) | Example 7 (X11457) (% by wt.) | Example 8 (X11458) (% by wt.) | Example 9 (X11459) (% by wt.) | Example 10 (X11460) (% by wt.) |
|---|---|---|---|---|---|
| $SiO_2$ | 59.10 | 59.10 | 59.10 | 59.10 | 58.70 |
| $Al_2O_3$ | 19.50 | 19.70 | 20.30 | 20.50 | 20.50 |
| MgO | 11.50 | 11.30 | 11.10 | 11.10 | 11.50 |
| CaO | 9.00 | 9.00 | 8.60 | 8.40 | 8.40 |
| $Li_2O$ | 0.00 | 0.00 | 0.00 | 0.00 | 0.00 |
| $Fe_2O_3$ | 0.27 | 0.27 | 0.27 | 0.27 | 0.27 |
| $K_2O$ | 0.07 | 0.07 | 0.07 | 0.07 | 0.07 |
| $Na_2O$ | 0.06 | 0.06 | 0.06 | 0.06 | 0.06 |
| $TiO_2$ | 0.50 | 0.50 | 0.50 | 0.50 | 0.50 |
| $Al_2O_3$/MgO | 1.70 | 1.74 | 1.83 | 1.85 | 1.78 |
| MgO/CaO | 1.28 | 1.26 | 1.29 | 1.32 | 1.37 |
| Property | | | | | |
| Fiberizing Temperature (° F.) | 2393 | 2400 | 2417 | 2413 | 2405 |
| Liquidus Temperature (° F.) | 2221 | 2218 | 2316 | 2249 | 2262 |
| ΔT (° F.) | 172 | 182 | 101 | 164 | 143 |

TABLE 3-continued

| Component | Example 6 (X11456) (% by wt.) | Example 7 (X11457) (% by wt.) | Example 8 (X11458) (% by wt.) | Example 9 (X11459) (% by wt.) | Example 10 (X11460) (% by wt.) |
|---|---|---|---|---|---|
| Density (g/cm$^3$) | 2.6060 | 2.6110 | 2.6054 | 2.6036 | 2.6108 |
| Elastic Modulus (GPa) | 89.3 | 89.5 | — | — | — |
| Specific Modulus (MJ/kg) | 34.3 | 34.3 | — | — | — |
| Strength (MPa) | 5004 | 4997 | — | — | — |

TABLE 4

| Component | Example 11 (X11461) (% by wt.) | Example 12 (X11472) (% by wt.) | Example 13 (X11505) (% by wt.) |
|---|---|---|---|
| SiO$_2$ | 59.10 | 58.70 | 59.00 |
| Al$_2$O$_3$ | 20.25 | 20.00 | 19.86 |
| MgO | 11.25 | 11.15 | 11.10 |
| CaO | 8.50 | 9.00 | 8.90 |
| Li$_2$O | 0.00 | 0.00 | 0.00 |
| Fe$_2$O$_3$ | 0.27 | 0.30 | 0.30 |
| K$_2$O | 0.07 | 0.07 | 0.07 |
| Na$_2$O | 0.06 | 0.14 | 0.14 |
| TiO$_2$ | 0.50 | 0.63 | 0.63 |
| Al$_2$O$_3$/MgO | 1.80 | 1.79 | 1.79 |
| MgO/CaO | 1.32 | 1.24 | 1.25 |
| Property | | | |
| Fiberizing Temperature (° F.) | 2413 | 2390 | 2395 |
| Liquidus Temperature (° F.) | 2240 | 2214 | 2228 |
| ΔT (° F.) | 173 | 176 | 167 |
| Density (g/cm$^3$) | 2.6059 | 2.612 | 2.6113 |
| Elastic Modulus (GPa) | — | 89.5 | — |
| Specific Modulus (MJ/kg) | — | 34.3 | — |
| Strength (MPa) | — | 4918 | — |

Tables 2 to 4 illustrate the unexpected increase in tensile strength achieved by glass fibers formed from compositions comprising 55.0 to 65.0% by weight SiO$_2$, 19.0 to 27.0% by weight Al$_2$O$_3$, 8.0 to 15.0% by weight MgO, 7.0 to 12.0% by weight CaO, 0.0 to 1.0% by weight Na$_2$O, 0 to 2.0% by weight TiO$_2$, 0 to 2.0% by weight Fe$_2$O$_3$, and no more than 0.5% by weight Li$_2$O, with an Al$_2$O$_3$/MgO ratio of no greater than 2.0. It was further discovered that the unexpected increase in tensile strength is directly tied to achieving both an Al$_2$O$_3$ concentration of at least 19.0% by weight and an Al$_2$O$_3$/MgO ratio of no greater than 2.0.

Additionally, the glass compositions of Examples 1-13 have surprisingly low fiberizing temperatures (less than 2,425° F.) and large ΔT values (at least 100° F.), while achieving superior mechanical properties. Specifically, the glass fibers achieve tensile strengths of at least 4,800 MPa and specific modulus of at least 34.3 MJ/kg. Various exemplary glass fibers achieve tensile strengths of at least 4,900 MPa, or at least 4,950 MPa, or at least 5,000 MPa. Such strength and specific modulus levels are unexpected in combination with the favorable fiberizing properties.

In addition, the glass compositions are particularly suited for applications that require stiffness to be equal to or greater than R-glass (e.g., wind blades). However, as illustrated below in Table 5, the glass compositions of the present inventive concepts advantageously also have favorable fiberizing properties, such as fiberizing temperatures (less than 2,425° F.).

TABLE 5

| Component | Example 12 (X11472) (% by wt.) | Comp. Example: R-glass (% by wt.) |
|---|---|---|
| SiO$_2$ | 58.70 | 59.00 |
| Al$_2$O$_3$ | 20.00 | 24.50 |
| MgO | 11.15 | 6.00 |
| CaO | 9.00 | 9.00 |
| Li$_2$O | 0.00 | 0.00 |
| Fe$_2$O$_3$ | 0.30 | 0.00 |
| K$_2$O | 0.07 | 0.00 |
| Na$_2$O | 0.14 | 0.00 |
| TiO$_2$ | 0.63 | 0.00 |
| Al$_2$O$_3$/MgO | 1.79 | 2.4 |
| MgO/CaO | 1.24 | 0.67 |
| Property | | |
| Fiberizing Temperature (° F.) | 2390 | 2530 |
| Liquidus Temperature (° F.) | 2214 | 2426 |
| ΔT (° F.) | 176 | 108 |
| Density (g/cm$^3$) | 2.612 | 2.56 |
| Strength (MPa) | 4918 | 5000 |

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

The invention claimed is:
1. A glass composition comprising:
SiO$_2$ in an amount from 55.0 to 65.0% by weight;
Al$_2$O$_3$ in an amount from 19.0 to 25.0% by weight;
CaO in an amount from 7 to 12.0% by weight;
MgO in an amount from 8.0 to 15.0% by weight;
Na$_2$O in an amount from 0 to 1.0% by weight;
Li$_2$O in an amount less than 0.5% by weight; and
TiO$_2$ in an amount from 0.0 to 1.5% by weight, expressed as percentages by weight based on the weight of the entire composition, wherein the weight percent ratio of $Al_2O_3/MgO$ is less than 2.0, wherein the combined amounts of $SiO_2$, $Al_2O_3$, MgO, and CaO is at least 98% by weight and less than 99.0% by weight, wherein the sum of the amounts of $B_2O_3$, $Li_2O$, and fluorine is less than 0.5% by weight, and wherein said glass composition has a fiberizing temperature no greater than 2,500° F.

2. The glass composition according to claim 1, wherein said composition comprises 19.5 to 21% by weight $Al_2O_3$.

3. The glass composition according to claim 1, wherein said composition comprises less than 0.2% by weight of $B_2O_3$.

4. The glass composition according to claim 1, wherein said composition comprises $Li_2O$ in an amount less than 0.1% by weight.

5. The glass composition according to claim 1, wherein said composition comprises 7.5 to 10% by weight CaO.

6. The glass composition according to claim 1, wherein the combined amounts of MgO and CaO is greater than 20% by weight.

7. The glass composition according to claim 1, wherein the combined amounts of MgO and CaO is less than 22% by weight.

8. The glass composition according to claim 1, wherein the combined amounts of $Fe_2O_3$, $TiO_2$, $K_2O$, and $Na_2O$ is below 1.5% by weight.

9. The glass composition according to claim 1, wherein the weight percent ratio of $Al_2O_3/MgO$ is no greater than 1.8.

10. A glass fiber formed from a glass composition according to claim 1, wherein said glass fiber has a tensile strength of at least 4,800 MPa.

11. The glass fiber according to claim 10, wherein the weight percent ratio of $Al_2O_3/MgO$ is no greater than 1.8.

12. A glass fiber according to claim 10, wherein said glass fiber has a specific modulus of at least 32.0 MJ/kg.

13. A reinforced composite product comprising:
a polymer matrix; and
a plurality of glass fibers formed from a glass composition according to claim 1, wherein said glass fibers have tensile strengths of at least 4,800 MPa.

14. A reinforced composite product according to claim 13, wherein said reinforced composite product is in the form of a wind blade.

15. A glass composition comprising:
$SiO_2$ in an amount from 55.0 to 65.0% by weight;
$Al_2O_3$ in an amount from 19.0 to 25.0% by weight;
CaO in an amount from 7 to 12.0% by weight;
MgO in an amount from 8.0 to 15.0% by weight;
$Na_2O$ in an amount from 0 to 1.0% by weight;
$Li_2O$ in an amount less than 0.5% by weight; and
$TiO_2$ in an amount from 0.0 to 1.5% by weight, expressed as percentages by weight based on the weight of the entire composition, wherein the weight percent ratio of $Al_2O_3/MgO$ is less than 2.0, wherein the combined amounts of $SiO_2$, $Al_2O_3$, MgO, and CaO is at least 98% by weight and less than 99.5% by weight, wherein the sum of the amounts of $B_2O_3$, $Li_2O$, and fluorine is less than 0.5% by weight, and wherein a glass fiber formed from said glass composition has a Young's modulus of at least 88.5 GPa.

16. The glass composition according to claim 15, wherein said composition comprises 7.5 to 10% by weight CaO.

17. The glass composition according to claim 15, wherein said glass composition has a fiberizing temperature no greater than 2,500° F.

18. The glass composition according to claim 15, wherein a glass fiber formed from said glass composition has a tensile strength of at least 4,800 MPa.

* * * * *